Figure 1:
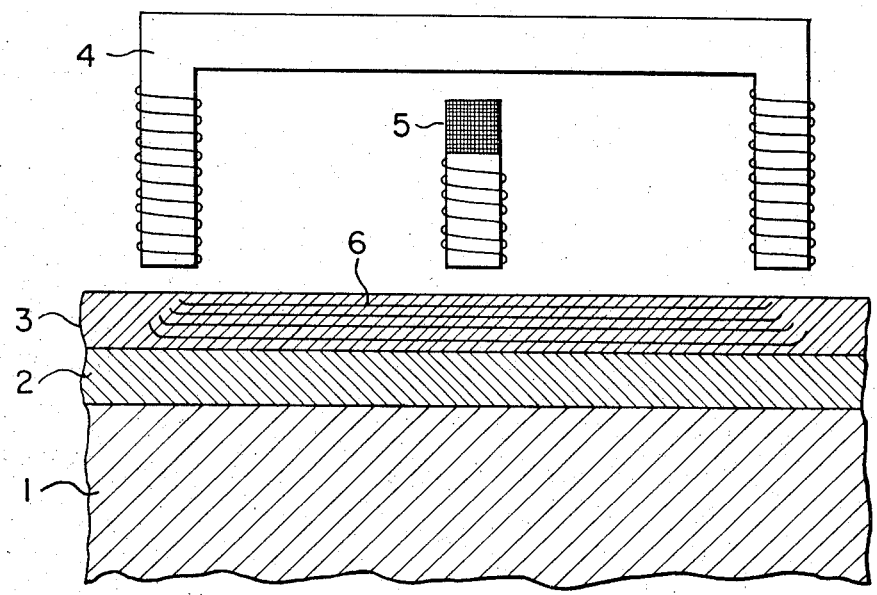

United States Patent [19]
Kawafune et al.

[11] 3,861,206
[45] Jan. 21, 1975

[54] METHOD AND DEVICE FOR MEASURING A STRESS EMPLOYING MAGNETOSTRICTION

[75] Inventors: Kazuyoshi Kawafune; Koji Nakazawa, both of Yokohama, Japan

[73] Assignee: Hitachi, Ltd., Tokyo, Japan

[22] Filed: Apr. 2, 1973

[21] Appl. No.: 346,894

[30] Foreign Application Priority Data
Apr. 3, 1972  Japan................................ 47-32662

[52] U.S. Cl............................. 73/141 R, 73/DIG. 2
[51] Int. Cl.............................................. G01r 33/18
[58] Field of Search............ 73/141 R, 141 A, 88.5, 73/DIG. 2; 117/234, 235, 238

[56] References Cited
UNITED STATES PATENTS

| | | | |
|---|---|---|---|
| 2,557,393 | 6/1951 | Rifenbergh | 73/88.5 X |
| 2,749,746 | 6/1956 | Wright | 73/88.5 R |
| 2,867,118 | 1/1959 | Cavanagh | 73/141 A |
| 3,340,729 | 9/1967 | Scoppe | 73/136 |
| 3,440,871 | 4/1969 | Vissnia | 73/141 A |

*Primary Examiner*—Richard C. Queisser
*Assistant Examiner*—Stephen A. Kreitman
*Attorney, Agent, or Firm*—Craig & Antonelli

[57] ABSTRACT

A method of measuring a stress of a material to be measured comprising the steps of magnetizing a ferromagnetic film formed on the surface of the material and detecting the variation of a magnetic flux of the film which is dependent upon the variation of the stress of the material to be measured, and a device for putting the method into practice.

5 Claims, 2 Drawing Figures

METHOD AND DEVICE FOR MEASURING A STRESS EMPLOYING MAGNETOSTRICTION

The present invention relates to a method for measuring a stress of an object by taking advantage of magnetostriction and a device for putting the method into practice.

A stress measuring method taking advantage of magnetostriction has been used for materials to be measured which are made of ferromagnetic substances. The principle of the stress measuring method is as follows:

The permeability of the material to be measured varies in dependence on the strain variation of the material to be measured. Accordingly, the variation of the permeability of the material to be measured can be detected as the variation of a magnetic flux density upon application of magnetic field to the material to be measure by the use of any suitable method. Thus, the stress of the material to be measured can be measured by detecting the variation of the magnetic flux density resulting from the strain variation of the material to be measured.

Conventional stress measuring methods taking advantage of magnetostriction have been such that the material to be measured which was made of the ferromagnetic substance was directly magnetized to detect the variation of the magnetic flux density resulting therefrom.

In general, the inner portions of the material to be measured are non-uniform due to various factors such as a residual stress, grain boundary, non-uniform ingredients, crystalline lattice defects, eduction of impurities, etc.. For this reason, the permeability of the material to be measured has different values depending upon its position or direction. Consequently, the material to be measured having a uniform strain exhibits the different result of measurement depending upon its position on or direction along which the measurement is carried out even if the material is measured by the measuring method which appears to be quite the same.

Even if, for example, the measurement is conducted for a shaft rotating at a regular speed to which a predetermined torsional moment is applied to exhibit the uniform distribution of the stress on the periphery of the rotating shaft, then the permeability on the periphery of the rotating shaft present the different values as mentioned above. As a result, the measuring method employing magnetostriction causes a phenomenon that the output of a detector fluctuates depending on the rotation of the shaft.

Further, the variation of the stress of the material to be measured causes a time lag relative to the variation of the output to be detected in response to the stress variation due to the above-mentioned various defects within the material to be measured. In addition, the application of the stress amplitude to the material to be measured causes the output to be detected to exhibit hysteresis characteristics.

Further, the distribution of the magnetic flux within the material to be measured upon magnetization thereof depends upon the configuration thereof. Accordingly, even the material to be measured which is made of the same substance and has the same stress brings about the different output to be detected because of the non-uniform distribution of the magnetic flux in dependence on its configuration.

Further, the conventional stress measuring method employing magnetostriction had the difficulty of measuring the stress if the material to be measured was not made of ferromagnetic material, and hence was not adapted for use in measuring the stress of the material other than the ferromagnetic material.

Accordingly, an object of the present invention is to provide a method for conducting a stable measurement of a stress through the magnetization of a film of a material having an excellent magnetostriction characteristic formed on the surface of a material to be measured.

Another object of the present invention is to measure a stress of a material to be measured which is formed of substances other than ferromagnetic material by the use of the measuring method employing magnetostriction by providing on the surface of the material to be measured a film of a material having an excellent magnetostriction characteristic.

A further object of the present invention is to provide a device for practicing the above-mentioned methods.

In order to attain the above-mentioned objects, according to the present invention, on the surface of the material to be measured there is formed a film of a non-magnetic substance, on which a film of a material having an excellent magnetostriction characteristic is further provided. According to the present invention the drawbacks of the conventional measuring methods are removed by passing almost all of magnetic fluxes for magnetizing the material to be measured through the above-mentioned film of the material having an excellent magnetostriction characteristic for detection of the magnetic flux by the use of a suitable method.

Figure 2:
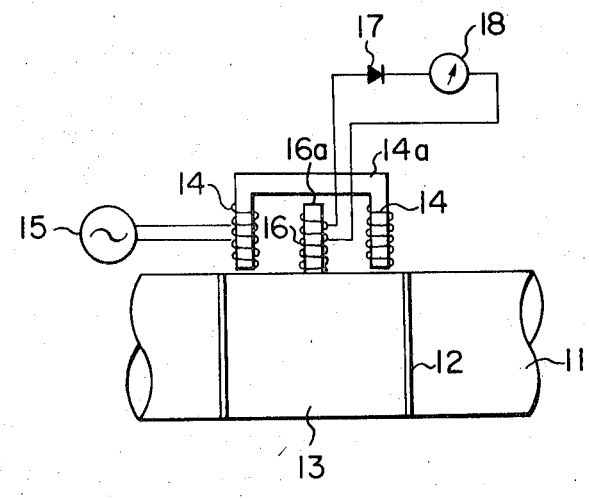

Still further objects and features of the present invention will be understood by the detailed description thereof in conjunction with the following accompanying drawings, in which;

FIG. 1 is an explanatory view illustrating a fundamental principle of the present invention, and FIG. 2 is an explanatory view illustrating an embodiment of the present invention.

FIG. 1 shows a fundamental principle of the present invention. In the same figure, numeral 1 shows a material to be measured which is made of a magnetic substance, 2 a film of a non-magnetic substance formed on the surface of the material 1 to be measured, 3 a film of a ferromagnetic substance formed on the surface of the non-magnetic film 2, 4 a magnetizing coil, 5 detecting coil and 6 magnetic fluxes produced from the magnetizing coil 4 and passing through the film 3.

In the above-mentioned arrangement, the film 2 is formed by the steps of finishing the surface of the material to be measured which is made of magnetic substance with face accuracy to a suitable level, then plating the surface thereof with the non-magnetic substance (copper, for example) and finishing the thus formed surface with face accuracy to a suitable level. The film 3 is formed by the step of plating the finished surface with the ferromagnetic material (for example, nickel, permalloy or iron) with its surface finished with face accuracy to a suitable level. In this respect, the area over which the plating of the non-magnetic substance is effected is preferably greater than that over which the plating of the ferromagnetic substance is effected.

In order to form the film layers 2 and 3, there is employed an electroplating, a non-electrolytic plating, fusing immersion plating, fused metal jetting method, vaccum-evaporating method, metallic piece adhering method or the like.

It is to be noted that in case the material 1 to be measured is made of non-magnetic material the film 2 of the non-magnetic material is not necessarily required.

As will be understood from FIG. 1, the magnetic fluxes 6 produced by the magnetizing coil 4 are interrupted by the film 2 of the non-magnetic substance, almost not passing through the material to be measured but passing through the film 3 of the ferromagnetic substance located on the surface thereof. Such a condition may be produced by suitably adjusting the materials of the films 2 and 3, their thickness and the magnetic flux density produced by the magnetizing coil 4.

Only the outermost film 3, therefore, imparts an influence upon the characteristics of the output to be detected of the magnetostriction, thus providing an improvement of the characteristics of the output to be detected of the magnetostriction.

The film 3 is, for example, uniformly formed by the electroplating under conditions that (1) an anode of a pure material should be employed; (2) the anode should be increased in number and disposed so as to provide uniform plating on the material to be plated; (3) the material to be plated should be rotated during the plating; (4) a clean plating solution having suitable compositions should be employed; and (5) the conditions of the plating operations should be adjusted with the plating solution in full agitation. The uniform formation of the plated layer permits the removal of irregularity of the permeability resulting from the difference of its location and orientation.

Thus, the uniform plating without any impurity permits the improvement of the time lag in terms of the output to be detected relative to the stress variation, or the influence thereupon due to the hysteresis characterics. For another use or object, it may be advantageous to apply a predetermined magnetic field to the material to be plated to provide magnetic anisotropy thereto when the plating is to be effected.

Conventionally, the stress of the non-magnetic material, for example, copper or resins such as plastics, could not be measured by the measuring method employing magnetostriction. As in the present invention, however, the formation of the film having magnetostriction characteristic on the surface of the non-magnetic material allows the stress to be measured by taking advantage of the magnetostriction.

An embodiment of the present invention will be described in connection with FIG. 2, in which reference numeral 11 shows a shaft of carbon steel, the surface of which is finished with face roughness above 6 $\mu$m. The surface of the shaft 11 is provided with a copper-plating 12 to a thickness of 0.5 mm, the surface of which is finished with face roughness above 6 $\mu$m. The finished surface of the copper-plating 12 is then provided with a nickel-plating 13 to a thickness of 0.5 mm, the surface of which is also finished with face roughness above 6 $\mu$m. A magnetizing coil 14 is wound around a core 14a in 100 turns. A current having a frequency of 1 KHz and a level of 1 A is applied from a power supply 15 to the magnetizing coil 14. A detecting coil 16 is wound around a core 16a in 400 turns. Numeral 17 indicates a rectifier and 18 a DC voltmeter.

With the above-mentioned arrangement, on the assumption of the shaft 11 being 46 mm thick in diameter, torque of 27 kg-m being exerted on the shaft 11 and the shaft 11 rotating at a regular speed, the application of the current of 1 KHz and 1A to the magnetizing coil 14 allows the output having the level of about 150 mV to be generated from the detecting coil 16, the output voltage being rectified by the rectifier 17 and read off on the DC voltmeter 18. If a relation between the voltage and torque is given, then the stress imposed on the shaft 11 can be measured with ease.

In the above-mentioned embodiment, the copper-plating has been thickly effected to magnetically isolate the shaft from the nickel-plated portion. If, however, the material to be measured is made of the non-magnetic materials or subjected to a heat treatment so as to be insensitive to magnetism, then the copper-plating can be neglected or effected as thinly as it only serves as a foundation plating for the plating of ferromagnetic material.

As mentioned above, according to the present invention, on the surface of the material to be measured there is formed the film made of the ferromagnetic material, through which almost all of the magnetic fluxes are adapted to pass, so that the drawbacks of the conventional measuring methods can be improved by improving the nature of the film made of the ferromagnetic material. Further, the measuring method employing magnetostriction can be advantageously adapted for use in measuring the stress of the materials made of the non-magnetic substance.

What we claim is:

1. In a method for measuring stress in a material by measuring a variation of the magnetostriction is a magnetostrictive material in response to stress applied to the material to be stress measured, the improvement comprising:

compensating for structural irregularities of the permeability of said magnetostrictive material by providing a film of a non-magnetic substance on a surface of the material to be stress measured, by providing a film having magnetostrictive characteristics over said film of non-magnetic substance and by passing magnetic flux through the magnetostrictive film; and measuring the variation of magnetic flux in said magnetostrictive film in response to stress of said material to be stress measured, said improvement further comprising applying a predetermined magnetic field to said magnetostrictive film during the step of providing said magnetostrictive film over said non-magnetic film to effect magnetic anisotropy to said magnetostrictive film.

2. A method according to claim 1, wherein said magnetostrictive film covers a smaller surface area than said non-magnetic film.

3. A method according to claim 1, wherein said non-magnetic film is provided on said material to be stress measured at a predetermined thickness, said thickness being dependent on the degree of magnetic characteristics of said material to be stress measured.

4. A method according to claim 1, wherein only said magnetostrictive film imparts an influence on the measurement of magnetic flux variation.

5. A method according to claim 1, wherein said magnetostrictive film is uniformly provided over said non-magnetic film.

* * * * *